United States Patent
Ross et al.

(10) Patent No.: US 11,893,612 B2
(45) Date of Patent: Feb. 6, 2024

(54) SHOPPING STORE PLANNING AND OPERATIONS USING LARGE-SCALE DISTRIBUTED RADIO INFRASTRUCTURE

(71) Applicant: AGILE DISPLAYS LLC, San Jose, CA (US)

(72) Inventors: Mark A. Ross, San Carlos, CA (US); Eduardo Chan, San Jose, CA (US)

(73) Assignee: AGILE DISPLAYS LLC, San Jose, CA (US)

( * ) Notice: Subject to any disclaimer, the term of this patent is extended or adjusted under 35 U.S.C. 154(b) by 0 days.

(21) Appl. No.: 18/067,476

(22) Filed: Dec. 16, 2022

(65) Prior Publication Data
US 2023/0281684 A1    Sep. 7, 2023

Related U.S. Application Data

(60) Provisional application No. 63/316,879, filed on Mar. 4, 2022.

(51) Int. Cl.
 *G06Q 30/00* (2023.01)
 *G06Q 30/0601* (2023.01)
 *G06K 7/10* (2006.01)

(52) U.S. Cl.
 CPC ..... *G06Q 30/0601* (2013.01); *G06K 7/10366* (2013.01)

(58) Field of Classification Search
 CPC ................................................ G06Q 30/06–08
 See application file for complete search history.

(56) References Cited

U.S. PATENT DOCUMENTS

| | | |
|---|---|---|
| 2005/0030158 A1 | 2/2005 | Schulmerich et al. |
| 2009/0192921 A1 | 7/2009 | Hicks |
| 2013/0155815 A1 | 6/2013 | Wulff et al. |
| 2016/0080485 A1* | 3/2016 | Hamedi ................ G06Q 50/01 709/204 |
| 2018/0260772 A1 | 9/2018 | Chaubard et al. |
| 2022/0051310 A1* | 2/2022 | Graube .............. G06Q 30/0633 |

OTHER PUBLICATIONS

"SES-Imagotag Signs an Exclusive Contract with JYSK Nordic" New Bites—Electronic, Feb. 9, 2016 (https://dialog.proquest.com/professional/docview/1763214519?accountid+131444)(Year: 2016).*
International Search Report and Written Opinion of the International Searching Authority dated Jul. 31, 2023 as received in Application No. PCT/US2023/14527.

* cited by examiner

*Primary Examiner* — Ethan D Civan
(74) *Attorney, Agent, or Firm* — Maschoff Brennan

(57) ABSTRACT

A shopping store system may include one or more shelves in which each shelf includes one or more levels and one or more products placed on the shelves. Electronic sign labels (ESLs) may be included in the shopping store system in which each of the ESLs is located in a particular position corresponding to a respective product placed on the shelves. Each ESL may include a multi-protocol radio that is configured to operate in a reception modality, a transmission modality, or a transceiving modality. The ESLs may each include a display that is configured to provide information about the respective product to which each ESL corresponds. The shopping store system may include a computer system configured to receive information transmitted by and process information received by each of the ESLs.

14 Claims, 9 Drawing Sheets

SHOPPING STORE PLANNING AND OPERATIONS USING LARGE-SCALE DISTRIBUTED RADIO INFRASTRUCTURE

CROSS-REFERENCE TO RELATED APPLICATIONS

This application claims the benefit of U.S. Patent Application Ser. No. 63/316,879, filed on Mar. 4, 2022, the disclosures of which are incorporated herein by reference in its entirety.

FIELD OF THE INVENTION

The present disclosure generally relates to shopping store planning and operations using large-scale distributed radio infrastructure.

BACKGROUND

Brick-and-mortar shopping stores may sell multiple products that are arranged and displayed on various shelves in the shopping stores for consumers to peruse. To facilitate purchase by the consumers, the products on the shelves may be labeled with a tag that may be attached to the shelf and aligned with the product to which the tag relates. The tag corresponding to a product may include an identity, a price, promotional materials, or any other information relating to the corresponding product.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a shopping store system may include one or more shelves in which each shelf includes one or more levels and one or more products placed on the shelves. Electronic sign labels (ESLs) may be included in the shopping store system in which each of the ESLs is located in a particular position corresponding to a respective product placed on the shelves. Each ESL may include a multi-protocol radio that is configured to operate in a reception modality, a transmission modality, or a transceiving modality. The ESLs may each include a display that is configured to provide information about the respective product to which each ESL corresponds. The shopping store system may include a computer system configured to receive information transmitted by and process information received by each of the ESLs.

According to an additional or alternative aspect of an embodiment, a method may include obtaining, by a radio receiver, radio signals from electronic sign labels (ESLs) in which each ESL of the plurality of ESLs is associated with a respective product in a shopping store and is configured to operate in a transmission modality on one or more radio frequency protocols. The method may include determining a location of each ESL based on the radio signals obtained from the plurality of ESLs and determining locations of one or more products based on the location of each of the ESLs and an association between each of the ESLs with the respective product. The method may include generating a planogram indicating the locations of the products.

According to an additional or alternative aspect of an embodiment, a method may include receiving, by one or more electronic sign labels (ESLs) in a shopping store, radio signals transmitted from a device associated with a customer in the shopping store over a period of time. The method may include determining a location of the customer based on locations of the ESLs in the shopping store that received the radio signal from the device. The method may also include generating a heatmap that includes the location of the customer over the period of time.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

An electronic sign label (ESL) may include an electronic display to provide information relating to a particular object, a method of communicating information to and from the ESL (e.g., instructing the ESL regarding what information is to be shown on the electronic display), and a battery to facilitate remote operation of the ESL. The method of communicating information may include a radio transmitter, receiver, and/or transceiver coupled to the ESL.

ESLs may be deployed in a brick-and-mortar shopping store such that the electronic display of the ESL shows information relating to one or more products sold in the shopping store. A given shopping store may display and sell thousands, tens of thousands, or hundreds of thousands of different types of or quantities of products. Consequently, the given shopping store may include a corresponding number of physical tags and/or ESLs to label the products being sold at the shopping store.

A shopping store may generate a map called a planogram to detail locations, quantities sold, quantities in stock, prices, and/or any other information relating to various products being sold at the shopping store. However, generating the planogram for the shopping store may be time-consuming because planograms are often generated manually, such as by an employee of the shopping store who surveys the shopping store and drafts the planogram. Furthermore, the shopping store may frequently change the locations of one or more products being offered by the shopping store such that planograms become quickly outdated and unrepresentative of the shopping store. Because planograms are typically difficult to generate efficiently and become outdated quickly, shopping stores may not want to invest time and/or resources for generating planograms that may be beneficial for marketing of products, planning product updates, analyzing shopper behavior, or for any other purposes.

Additionally or alternatively, operators and owners of the shopping store may want to track shopper behavior within the shopping store to analyze product popularity, effectiveness of promotional campaigns, accessibility of particular areas of the shopping store, or for any other purposes. However, collecting such information regarding shopper behavior on a large scale may be challenging for the shopping store.

The present disclosure relates to, among other things, a large-scale distributed radio system that may be used to send and receive information to various ESLs associated with products and/or locations in a shopping store (e.g., shelves in the shopping store). The large-scale distributed radio system includes ESLs that may each include multi-protocol operation capabilities that are configured to transmit and/or receive radio signals to collect information about the shopping store in which the large-scale distributed radio system is implemented.

Embodiments of the present disclosure are explained with reference to the accompanying figures.

Figure 1A:
FIGS. 1A and 1B are example embodiments of an electronic sign label (ESL) tag that may be used to facilitate a distributed shopping store radio system according to at least one embodiment of the present disclosure.
Figure 1B:
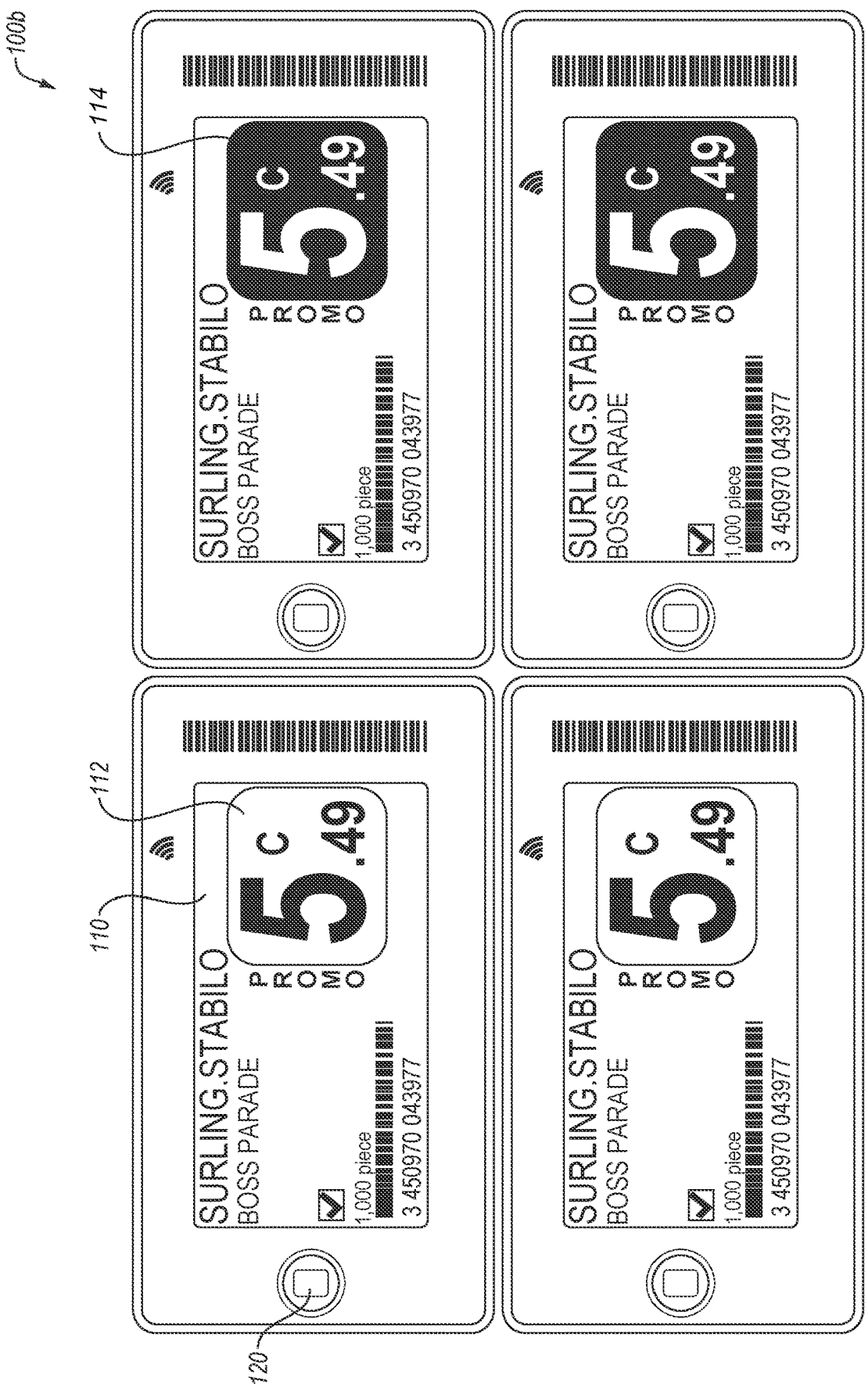

FIGS. 1A and 1B are example embodiments of ESLs 100a and 100b (collectively described as "ESLs 100") that may be used to facilitate a distributed shopping store radio system according to at least one embodiment of the present disclosure. The ESL 100 may include a display 110 that presents information about a particular product. For example, the display 110 may present a product name, a product identification number, a barcode corresponding to the product, a price of the product, a quantity of products available in stock, a quantity of products already sold, whether the product is involved in any promotional campaigns, or any other information relating to the product. In some embodiments, the displays 110 of different ESLs 100 may present different information depending on an intended viewer of the different ESLs. For example, a first ESL display may be used for inventory purposes by employees, managers, and/or other operators of a shopping store, and a second ESL display used in the same shopping store may be intended to be viewed by customers of the shopping store. The first ESL display may present information such as the price of the product, the quantity of the product available in stock at the shopping store, the quantity of products previously sold (during the day, since a previous shipment, since a product's release, etc.), the product identification number, and/or any other information that may be useful to the shopping store. The second ESL display may present information such as the price of the product and/or promotional campaign details involving the product such that the customer of the shopping store is not provided sensitive or unnecessary information involving the product.

Additionally or alternatively, the ESL 100 may include one or more light-emitting diodes (LEDs) 120 that emit a particular color of light. The LED color may provide additional information about the corresponding product and/or for the customer. For example, the LEDs 120 may provide personalized information to a particular customer regarding personalized promotional offers and/or guidance regarding items included on the particular customer's shopping list.

In some embodiments, the displays 110 of the ESLs 100 may exhibit different colors, such as a white price tag 112 or a black price tag 114 as illustrated in FIG. 1B. The different colors exhibitable on the displays 110 may be used to indicate one or more differences between products associated with the ESLs 100. For example, a first particular ESL displaying the white price tag 112 may indicate that the associated product is not on sale, while a second particular ESL displaying the black price tag 114 may indicate that a promotion may be active involving the associated product. As another example, the different colors exhibited by the displays 110 may indicate that the associated products belong to different product categories (e.g., the white price tag 112 relating to clothing products and the black price tag 114 relating to food products).

In some embodiments, the ESL 100 may include a radio configured to send and/or receive information according to a multimodal timed-slot architecture. The radio may be communicatively coupled with a computer system, such as a computer system associated with operations and management of the shopping store in which the ESL 100 is deployed, via the radio so that the ESL 100 may receive radio signals from the computer system relating to product information updates. Additionally or alternatively, the ESL 100 may receive radio signals from one or more other devices configured to emit radio signals. The ESL 100 may then transmit information and/or ping the computer system based on the radio signals received by the ESL 100 from the other devices. In some embodiments, the radio of the ESL 100 may be configured to operate using multiple radio-signaling protocols when receiving radio signals having various signal frequencies, such as a near-field communication (NFC), Bluetooth, Bluetooth low energy (BLE), thread, Wi-Fi, Ultra-Wideband (UWB), Long-Term Evolution (LTE), 5G, and/or proprietary frequency ranges. In these and other embodiments, the radio-signaling protocols used by the radios of the ESL 100 may involve standard or proprietary frequency ranges with standard or proprietary radio protocols. For example, a proprietary multi-modal radio protocol may involve having some of the ESLs 100 (e.g., 10%, 20%, 30%, 40%, 50%, 60%, 70%, 80%, 90%, 95%, or 98% of the ESLs 100) be in a "sleep" state in which the ESLs 100 are not transmitting or receiving radio signals to decrease power consumption with specified times for activating a given ESL 100 for multi-modal radio signaling.

In some embodiments, the multi-protocol capabilities of the radio of the ESL 100 may facilitate receiving radio signals from radio-enabled devices associated with customers of the shopping store in which the ESL 100 is implemented. For example, a customer's smartphone may be configured to transmit Bluetooth signals that may be received by the ESLs 100. The customer may allow the ESL 100 to receive the Bluetooth signals transmitted by the customer's smartphone to provide interactions with a customer's movement through the shopping store. In this and other examples, the ESLs 100 may guide the customer (e.g., according to a shopping list associated with the customer included in the customer's smartphone), such as using different colored LED lights. As another example, the ESLs 100 may provide promotional materials and/or product suggestions based on the customer's movement patterns, products purchased, or any other information about the customer obtainable by receiving radio signals from a device associated with the customer.

Figure 2:
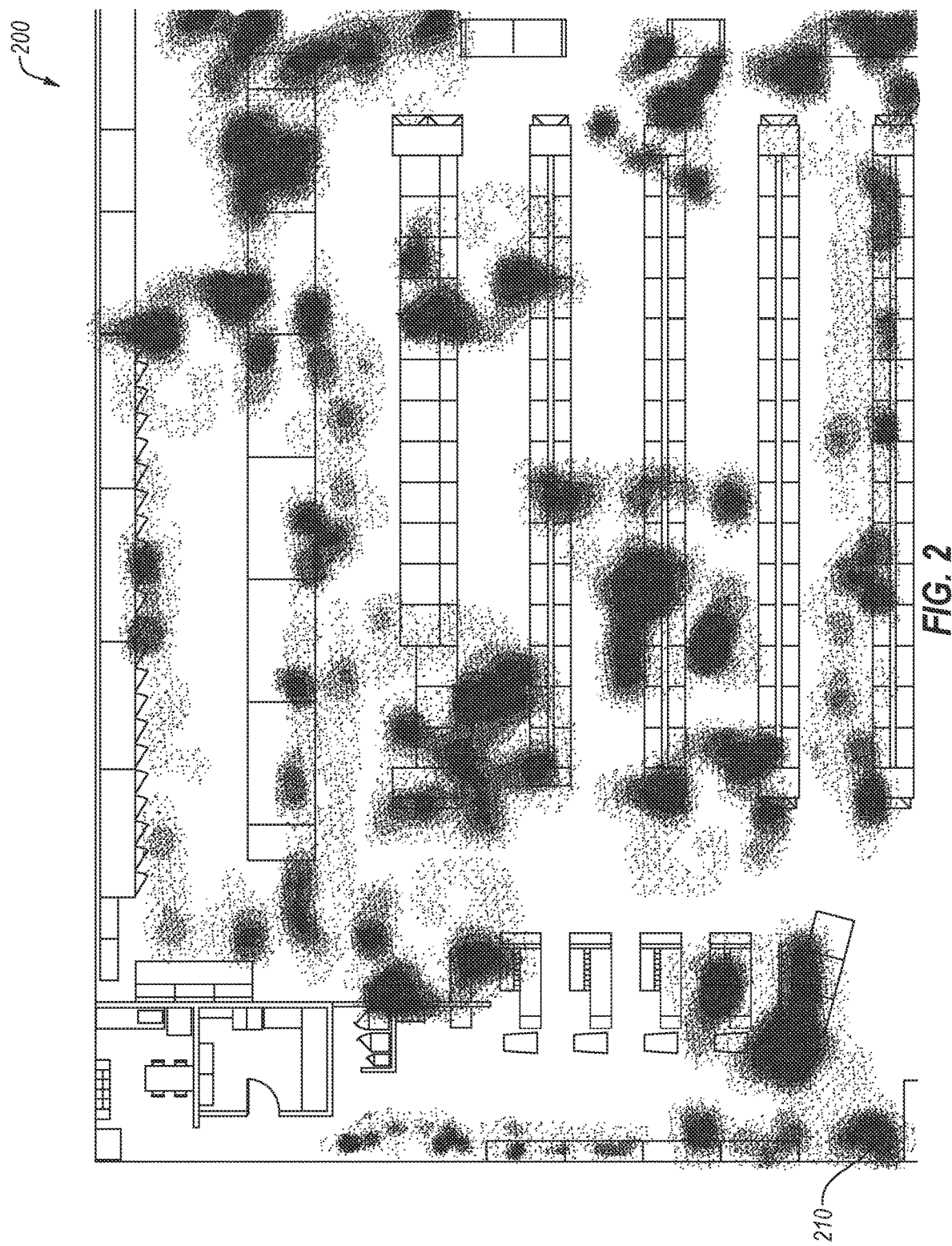
FIG. 2 is an example of a heatmap generated by the distributed shopping store radio system according to at least one embodiment of the present disclosure.

In some embodiments, the ESL 100 in the reception modality may facilitate product analysis for the shopping store in which the ESL 100 is implemented. For example, FIG. 2 is an example of a heatmap 200 generated by the distributed shopping store radio system according to at least one embodiment of the present disclosure. The heatmap 200 may be a two-dimensional graphical representation of three-dimensional data in which one of the three dimensions of data is represented using one or more colors. In some embodiments, the heatmap 200 may track movement of one or more customers in the shopping store in which the movement of the customers tracked for the heatmap 200 may be represented by one or more heat spots 210. Different colors of the heat spots 210 may indicate different characteristics of the one or more customers' movements, such as a given customer's dwelling time at a given position, a number of customers standing at a given position for longer than a given time threshold, or some combination thereof. For example, the heatmap 200 may be generated based on a single customer's movement throughout the shopping store, and different colors of the heat spots 210 may indicate a duration of time that the customer stayed in a particular location in the shopping store. In this and other examples, cooler colors (e.g., blue and/or green) associated with the heat spots 210 may indicate that the customer did not stay in a particular location associated with the heat spots 210 as long as heat spots 210 that include warmer colors (e.g., yellow, orange, and/or red). As another example, the heatmap 200 may be generated based on several customers' movements throughout the shopping store. In this and other examples, the different colors of the heat spots 210 may indicate a frequency and/or a duration with which customers stayed in a particular location in the shopping store. In this and other examples, cooler colors may indicate that fewer customers stayed in a particular heat spot, while warmer colors indicate that a greater number of customers stayed in the particular heat spot.

Returning to the description of FIG. 1, the multimodal timed-slot architecture may also involve switching the radio of the ESL 100 from a reception modality to a transmission modality in which the radio is configured to transmit radio signals to nearby devices. In other words, the radio of the ESL 100 may switch from being configured to receive information updates via radio signals to transmitting radio signals as a beacon such that nearby devices may receive information pertaining to the ESL 100. In some embodiments, the multimodal timed-slot architecture may be applied to a group of ESLs 100 that operate in the transmission modality. Because each of the ESLs may be powered by a battery, constant transmission of radio signals by every ESL in the group may be inefficient for the battery lives of the ESLs. In order to preserve the battery life of each of the ESLs 100, a particular group of related ESLs (e.g., related according to geographical proximity to one another within the same shopping store) may specify a subset of the particular group of ESLs 100 to transmit radio signals in the transmission modality, while some or most of the ESLs 100 included in the particular group remain inactive during the transmission modality.

In these and other embodiments, the identities of the ESLs 100 included in the subset may be updated at different times such that different ESLs included in the particular group are designated for transmitting radio signals to distribute and regularize battery usage among the group of ESLs 100. For example, a particular group of ESLs may include ten ESLs, and during a first period of time, the particular group of ESLs may designate a first ESL and a second ESL of the group as the subset of transmitting ESLs with the other eight ESLs being inactive. In this and other examples, the particular group of ESLs may designate a third ESL and a fourth ESL of the group as the subset of transmitting ESLs during a second period of time with the other eight ESLs, now including the first ESL and the second ESL, being inactive.

Figure 3:
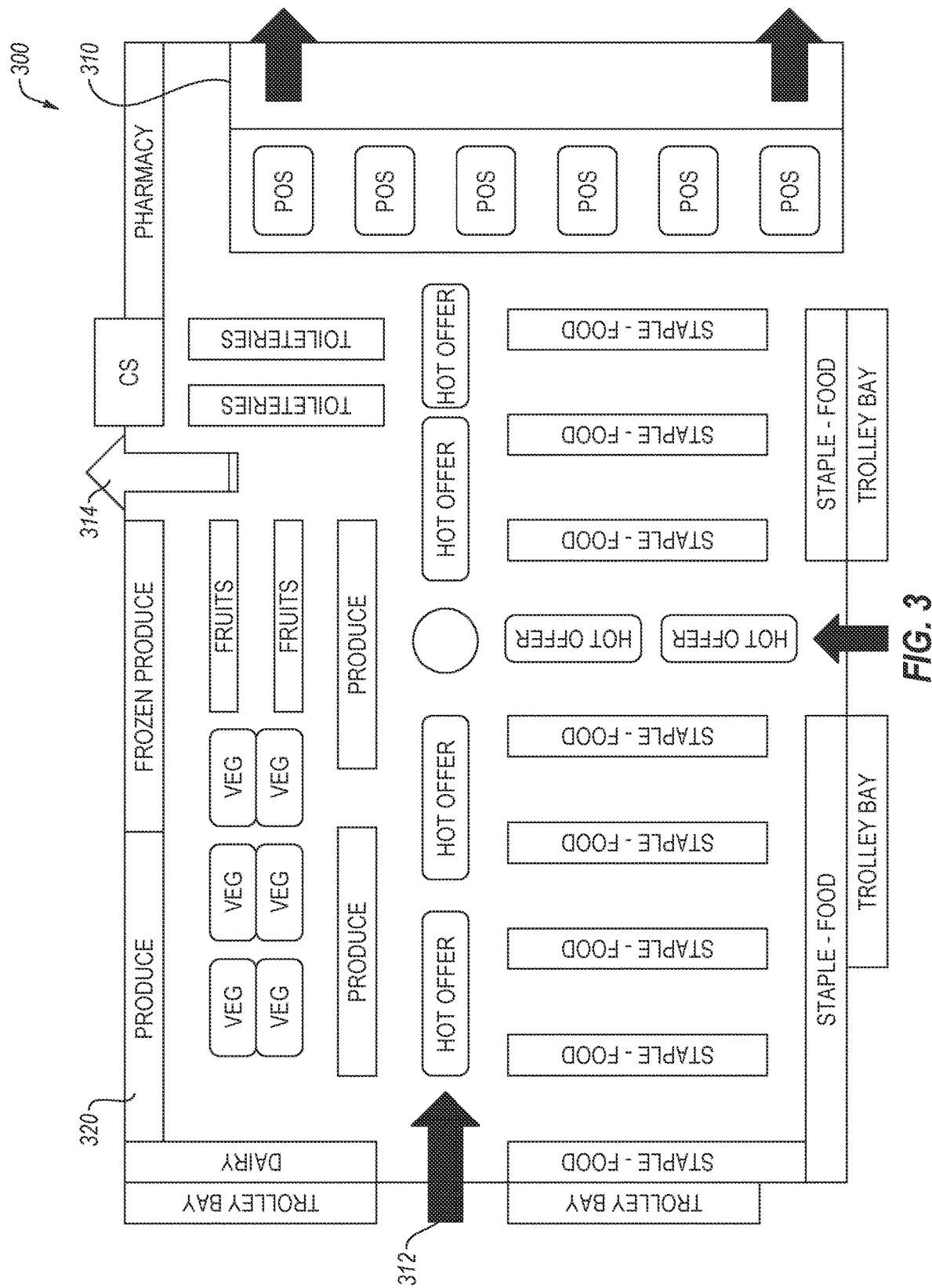
FIG. 3 is an example of a planogram generated by the distributed shopping store radio system according to at least one embodiment of the present disclosure.

In the transmission modality, the ESL 100 may facilitate product analysis for the shopping store in which the ESL 100 is implemented. For example, FIG. 3 is an example of a planogram 300 of a shopping store generated using a distributed shopping store radio system according to at least one embodiment of the present disclosure. The planogram 300 may be generated by a computer system that receives radio signals from one or more ESLs included in the shopping store. In some embodiments, the planogram 300 may include a planogram skeleton 310 that indicates a floor plan of the shopping store that does not include any products. For example, the planogram skeleton 310 may include locations of one or more entrances 312 and/or one or more exits 314 of the shopping store and lengths of one or more walls of the shopping store. The computer system may receive radio signals from each of the ESLs that include a location and an identity of each of the products associated with the received radio signals from the ESLs. In some embodiments, the computer system may determine the positions of each product associated with a received radio signal based on features included in the planogram skeleton 310, such as one or more of the entrances 312, one or more of the exits 314, and/or one or more of the walls of the shopping store.

Based on the positions of the products as determined by the radio signals corresponding to the ESLs, the planogram skeleton 310 may be populated with one or more shelves 320. In some embodiments, the computer system may determine a size of a particular shelf 320 based on a quantity and/or a density of received radio signals from a particular area in the shopping store. Additionally or alternatively, the shelves 320 may be previously included in the planogram skeleton 310, and the positions of the received radio signals may be used to assess whether a particular ESL associated with a particular received radio signal is located near or on one of the shelves 320.

The identities of the products corresponding to each of the ESLs may be correlated with the position information to facilitate labeling each of the shelves 320. In some embodiments, the identity of a particular product may include a product name and a product category such that the shelf 320 on which the particular product is located based on the radio signal corresponding to an ESL associated with the particular product may be labeled using the product name and/or the product category. For example, each shelf 320 may be labeled according to the product category as illustrated in FIG. 3. As another example, each shelf 320 may be labeled according to the product category (i.e., color coded), and the product name may be used to provide additional granularity and detail in the planogram 300. As another example, the shelves 320 may be labeled according to only the product names without including the product categories in the planogram 300.

In some embodiments, the ESLs of the distributed shopping store radio system may be used with a camera or any other image-capturing systems to facilitate generating the planogram 300 and/or update the generated planogram 300. One or more cameras or other image-capturing sensors may be paired with each of the ESLs so that the cameras may capture additional information regarding the products to which the ESLs correspond and/or verify information included in the ESLs. For example, a camera system may be implemented to visually identify and/or verify stocking levels, locations, and/or any other information about the products as described by corresponding ESLs. In these and other embodiments, the cameras may be included as a discrete system that is communicatively coupled to and configured to send image information to the distributed shopping store radio system. Additionally or alternatively, the cameras may be integrated into components associated with the distributed shopping store radio system. For example, a given camera may be embedded in the ESLs or coupled to a shopping cart used in a shopping store associated with the distributed shopping store radio system. As an additional or alternative example, the given camera may include a phone camera corresponding to a mobile device used by customers of the shopping store.

Modifications, additions, or omissions may be made to the ESL 100 without departing from the scope of the present disclosure. For example, the designations of different elements in the manner described is meant to help explain concepts described herein and is not limiting. Further, the ESL 100 may include any number of other elements or may be implemented within other systems or contexts than those described.

Figure 4:
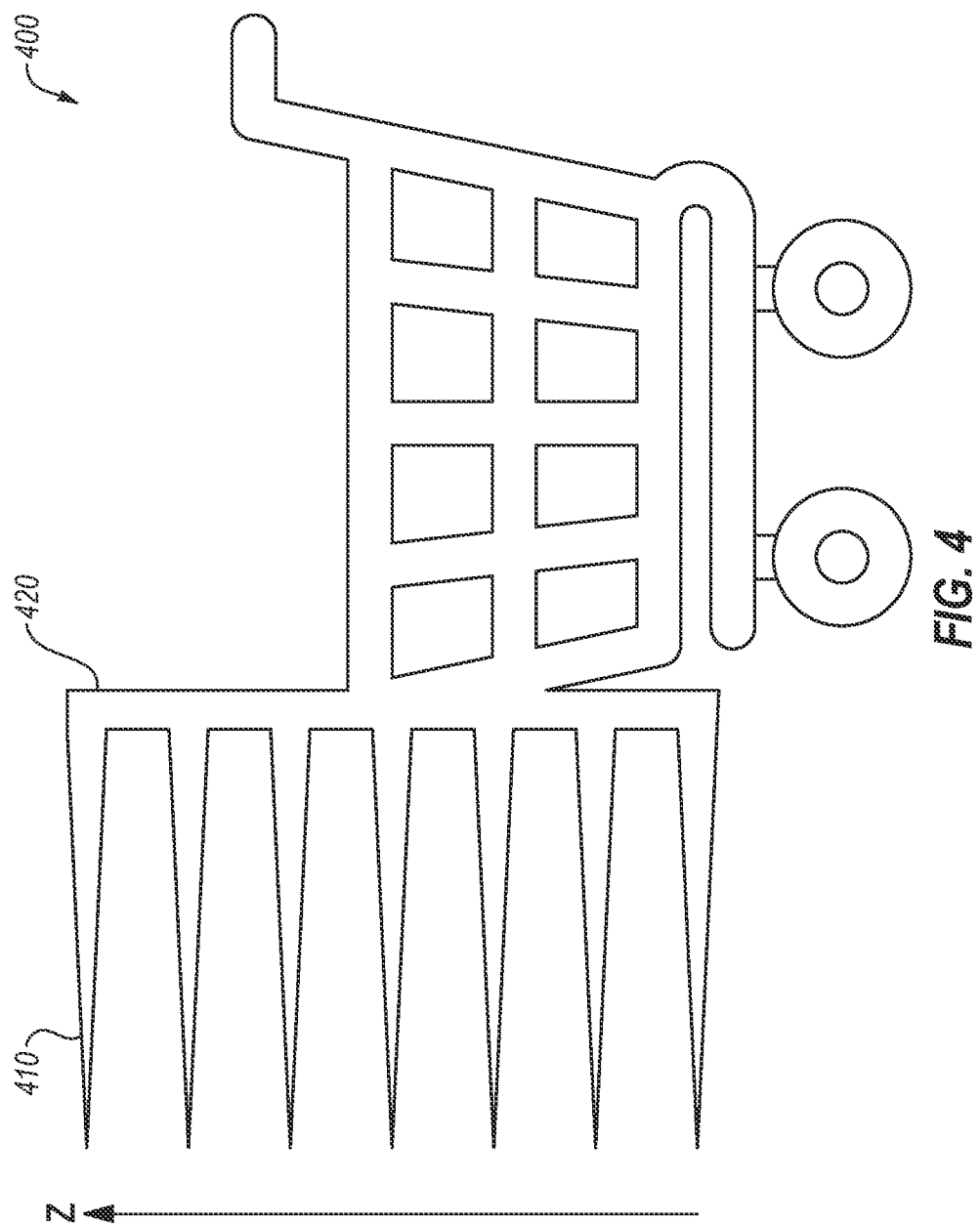
FIG. 4 is an example embodiment of a shopping cart that includes radio antennas to facilitate generating the planogram according to at least one embodiment of the present disclosure.

FIG. 4 is an example embodiment of a shopping cart 400 that includes radio antennas 410 to facilitate generating the planogram according to at least one embodiment of the present disclosure. The shopping cart 400 may be an example of a device that may be used in conjunction with the ESLs of a shopping store to facilitate operations of the ESLs in the reception modality and/or the transmission modality.

In some embodiments, the shopping cart 400 may include radio antennas 410 mounted on a post 420. The post 420 may be oriented in a vertical direction along a z-axis with the radio antennas 410 oriented at different heights (i.e., different z-coordinates) along the post 420 such that the radio antennas 410 on the post 420 make a linear, vertically aligned array of radio receivers, radio transmitters, or radio transceivers. In some embodiments, positioning the radio antennas 410 along a length of the post 420 may facilitate using the shopping cart 400 to determine a three-dimensional location of a particular ESL that is configured in a transmitting modality. For example, the radio signal transmitted by the particular ESL may indicate the two-dimensional location of the particular ESL in the shopping store. A height of the particular ESL on a shelf in the shopping store may be determined based on a radio signal strength indicator (RSSI) of a radio signal received by the radio antennas 410 of the shopping cart 400 in which the RSSI received at each position along the length of the post 420 differs depending on the height of the particular ESL. In this and other examples, the height of the particular ESL may be approximated as corresponding to the height of a particular radio antenna 410 at which the greatest RSSI is captured. One or more of the radio antennas 410 may receive the radio signal transmitted by the particular ESL but at varying signal strengths because of the height difference between the radio antennas 410. Consequently, RSSI may be used to determine a height of the source ESL of the transmitted radio signal based on differences in the signal strength received by the various radio antennas 410.

Additionally or alternatively, the radio antennas 410 may be configured as a directional antenna that includes a directional reception pattern that facilitates sending and/or receiving greater power in specific directions. The increased sensitivity of the radio antennas 410 in specific directions may facilitate determining the height of a particular ESL by adding another dimensionality to the radio signals being sent and/or received by the radio antennas 410. The RSSI of a radio signal sent by the particular ESL and received by the radio antennas 410 and/or the RSSI of a radio signal sent by the radio antennas 410 and received by the particular ESL may be used to determine the height of the particular ESL based on the directional sensitivity of the radio antennas 410.

To determine a two-dimensional location of one or more of the ESLs (i.e., an x-coordinate and a y-coordinate associated with each ESL with respect to the shopping store), the shopping cart 400 may, in some embodiments, include a global positioning system (GPS) tracker, a UWB ranger, or any other radio device from which the ESLs may receive radio signals to specify the two-dimensional location of the ESLs.

Additionally or alternatively, the shopping cart 400 may be used to generate heatmaps, such as the heatmap 200, corresponding to movement of customers in a shopping store. Because the customers of the shopping store may or may not bring devices that are configured to communicate with the ESLs using one or more of radio protocols (e.g., smartphones using Bluetooth, UWB, etc.) and/or customers' devices may or may not have radio communications enabled, having the shopping cart 400 equipped with the radio antennas 410 may facilitate more regularized and/or standardized tracking of customer movement. The ESLs located around the shopping store may be configured to receive radio signals transmitted by the radio antennas 410 of the shopping cart to track movement of the customer using the shopping cart 400.

Modifications, additions, or omissions may be made to the shopping cart 400 without departing from the scope of the present disclosure. For example, the designations of different elements in the manner described is meant to help explain concepts described herein and is not limiting. Further, the shopping cart 400 may include any number of other elements or may be implemented within other systems or contexts than those described.

Figure 5:
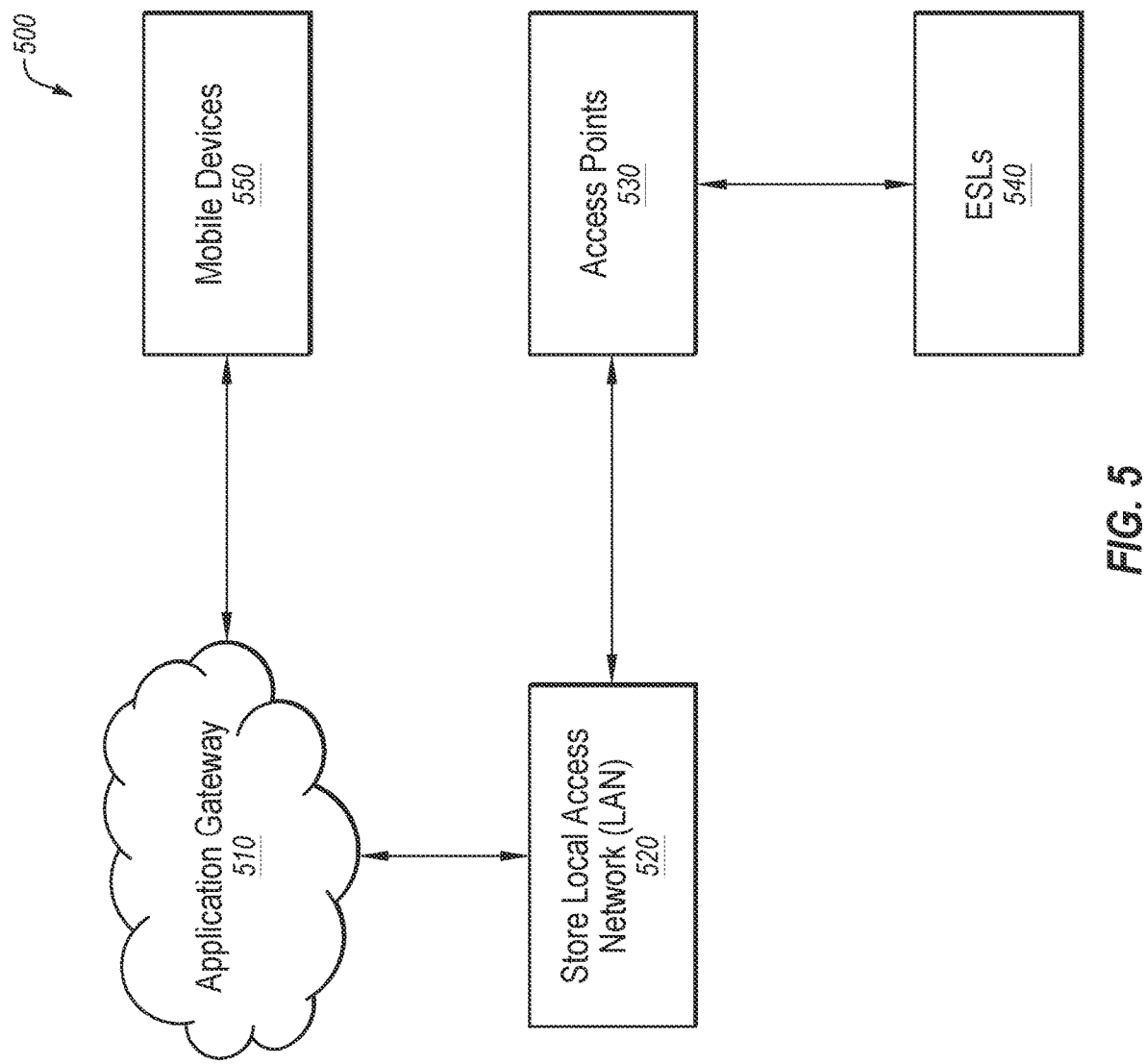
FIG. 5 is a diagram of an example shopping store system according to at least one embodiment of the present disclosure.

FIG. 5 is a diagram of an example shopping store system 500 according to at least one embodiment of the present disclosure. The shopping store system 500 may be configured to facilitate communication between customers and ESLs 540 deployed in a shopping store corresponding to the shopping store system 500 such that information may be provided for or obtained from the customers of the shopping store. The shopping store system 500 may include an application gateway 510, a store local access network (LAN) 520, one or more access points 530, and the ESLs 540. In some embodiments, the ESLs 540 may be the same as or similar to the ESLs 100a and 100b as described in relation to FIGS. 1A and 1B. In some embodiments, one or more mobile devices 550 may be configured to communicate with the store LAN 520 such that information relating to the mobile devices 550 may be sent to the shopping store system 500 or information relating to the shopping store system 500 may be sent to the mobile devices 550.

In some embodiments, the application gateway 510 may include one or more nodes in a computer network that are configured to receive information from the mobile devices 550 relating to the shopping trips of the users of the mobile devices 550. For example, the mobile devices 550 may send information regarding device locations, shopping lists, shopper product preferences, some combination thereof, or any other information that may be pertinent to a given shopping trip. The application gateway 510 may additionally or alternatively facilitate sending information from the store LAN 520 to the mobile devices 550. For example, the store LAN 520 may be configured to send notifications regarding product deals, locations of items included in shopping lists, grocery delivery readiness statuses, some combination thereof, or any other information to the mobile devices 550. In some embodiments, the mobile devices 550 may include a software application, such as a mobile app, with which the application gateway 510 may be allowed to communicate so that the application gateway 510 may send information from the store LAN 520 or receive information from the mobile devices 550.

The ESLs 540 may be communicatively coupled to the store LAN 520 via the access points 530. In some embodiments, the ESLs 540 may be configured to send any information collected by the ESLs 540 (e.g., while in a reception modality) to the store LAN 520 via the access points 530. Additionally or alternatively, the store LAN 520 may be configured to send instructions to the ESLs 540 for changing the modalities of the ESLs 540 or displaying particular types of information (e.g., particular colors, specific text messages, or some combination thereof) via the access points 530 responsive to receiving particular information from the mobile devices 550 or any changes originating from the store LAN 520 itself. In these and other embodiments, the information received from the ESLs 540 or provided to the ESLs 540 by the store LAN 520 may be used to generate the heatmap 200 as described in relation to FIG. 2, the planogram 300 as described in relation to FIG. 3, or any other operations associated with the shopping store system 500.

In some embodiments, the store LAN 520 may determine a directionality of communication with the mobile devices 550 and the ESLs 540 based on whether the mobile devices 550 and the ESLs 540 are categorized as passive devices or active devices. For example, the shopping cart 400 as described in relation to FIG. 4 may be configured to perform active identification (e.g., by transmitting radio signals) of the mobile devices 550 or the ESLs 540, which are classified as passive devices (e.g., radio receivers), to facilitate communications or interactive operations of the shopping store system 500. In such an example, the store LAN 520 may be configured to send information to the application gateway 510 and the access points 530 so that information may be relayed to the mobile devices 550 and the ESLs 540, respectively. As an additional or alternative example, a particular customer with a particular mobile device 550 may choose to opt in to being an active device, such as via a user configuration menu in a mobile app associated with the store LAN 520. In this and other examples, the given mobile device 550 may be classified as an active device that sends information to the access points 530 and the store LAN 520 for generating the heatmap 200. In situations in which the given mobile device 550 is classified as a passive device, the store LAN 520 may instruct the ESLs 540 to be configured in a transmitting modality as signal beacons, and the given mobile device 550 may capture signals from the ESLs 540 rather than transmitting signals as an active device.

Modifications, additions, or omissions may be made to the shopping store system 500 without departing from the scope of the present disclosure. For example, the designations of different elements in the manner described is meant to help explain concepts described herein and is not limiting. For instance, in some embodiments, the application gateway 510, the store LAN 520, the access points 530, the ESLs 540, and the mobile devices 550 are delineated in the specific manner described to help with explaining concepts described herein but such delineation is not meant to be limiting. Further, the shopping store system 500 may include any number of other elements or may be implemented within other systems or contexts than those described.

Figure 6:
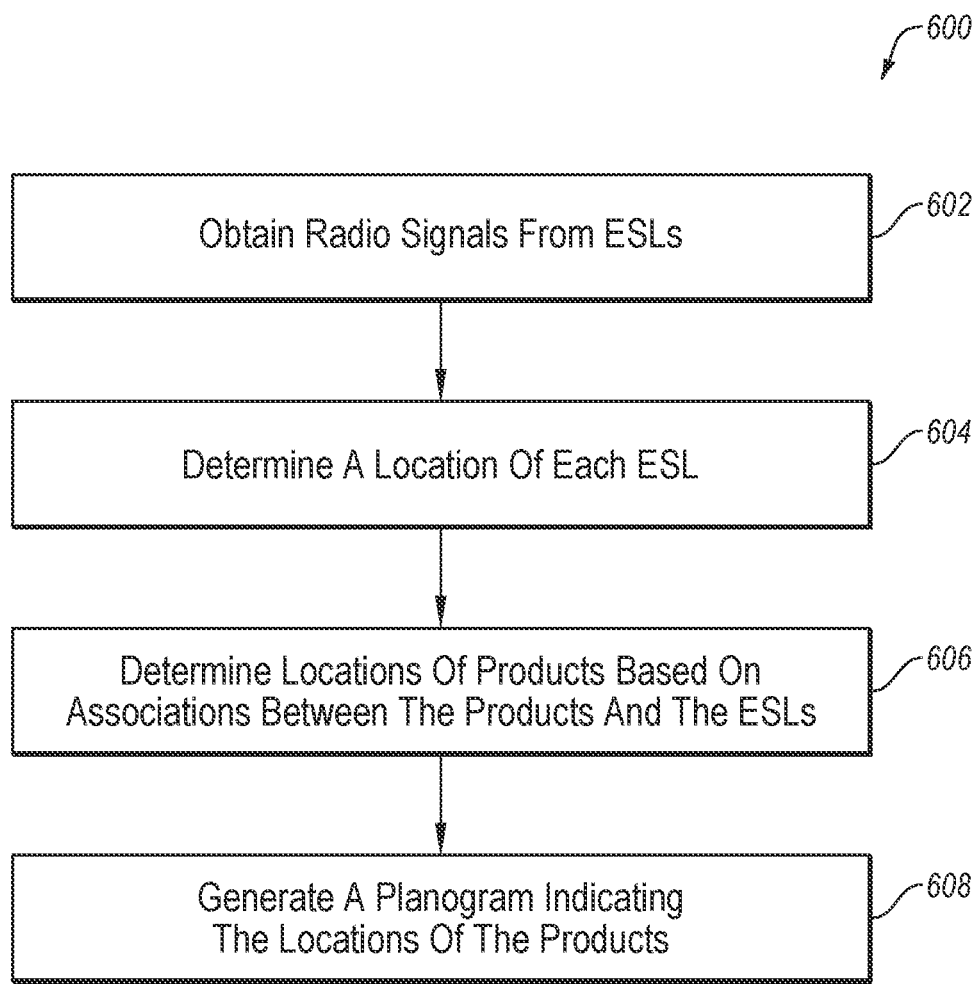
FIG. 6 is a flowchart of an example method of generating a planogram according to at least one embodiment of the present disclosure.

FIG. 6 is a flowchart of an example method 600 of generating a planogram according to at least one embodiment of the present disclosure. The method 600 may be performed by any suitable system, apparatus, or device. For example, the shopping store system 500 as described in relation to FIG. 5 or a computer system 800 as described in relation to FIG. 8 may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where radio signals are obtained from the ESLs. A shopping store may include ESLs that are configured to operate in a transmission modality such that each of the ESLs may transmit radio signals. To generate a planogram mapping products located in the shopping store, such as the planogram 300 as described in relation to FIG. 3, each of the ESLs may be configured to transmit a radio signal that includes information identifying the ESL, which may be obtained by a computer system, such as the shopping store system 500 as described in relation to FIG. 5 or the computer system 800 as described in relation to FIG. 8, via a corresponding radio receiver. In addition to or as an alternative to the information identifying the ESL, the radio signal may include information relating to one or more shopping products associated with the ESL, a time of signal transmission, one or more product stocking levels, or any other information.

In some embodiments, one or more of the ESLs may simultaneously transmit radio signals such that one or more radio receivers or a software-defined radio with a large bandwidth may receive some or all of the transmitted radio signals simultaneously. For example, a first ESL may transmit a first radio signal at the same or a similar time as a second ESL transmitting a second radio signal with the first radio signal and the second radio signal being transmitted along different radio frequency channels. A particular radio receiver may be configured to simultaneously decode received radio signals adhering to standard radio protocols from multiple different radio transmitters along a broad bandwidth such that the particular radio receiver may decode both the first radio signal transmitted by the first ESL and the second radio signal transmitted by the second ESL. Additionally or alternatively, the ESLs may be configured to transmit radio signals sequentially such that a radio receiver may receive each of the transmitted radio signals at distinct times.

At block 604, a location of each ESL may be determined. In some embodiments, the location of a given ESL may be determined based on the radio signal transmitted by the given ESL including information regarding the location of the given ESL. Additionally or alternatively, the radio signal transmitted by the given ESL may be received by two or more radio receivers such that the location of the given ESL may be triangulated based on the locations of the radio receivers.

At block 606, locations of products associated with each of the ESLs may be determined. Each of the ESLs may be positioned at a location that corresponds to the locations of one or more products such that determining the location of a given ESL provides an accurate approximation of the location of the one or more products associated with the given ESL. In some embodiments, the radio signals transmitted by the ESLs may include product names, product identification numbers, or any other information identifying to which products the ESLs correspond. Additionally or alternatively, the radio signals may include information relating to the product, such as a stocking level, an inventory count, or a designated product location within the shopping store.

At block 608, a planogram indicating the locations of the products may be generated. In some embodiments, the planogram may be the same as or similar to the planogram 300 as described in relation to FIG. 3 in that the planogram provides a visual representation of a given shopping store and maps the locations of various products within the shopping store. The planogram may additionally or alternatively represent stocking levels of the products, such as with color-coding, visual transparency, numerical labels, or variations in object sizing. In some embodiments, the given shopping store may include an image-capturing system that includes, for example, various cameras positioned and configured to observe stocking locations and stocking levels of products located on different shelves in the given shopping store. In these and other embodiments, the image-capturing system may facilitate verification or supplementing of the planogram of the given shopping store.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
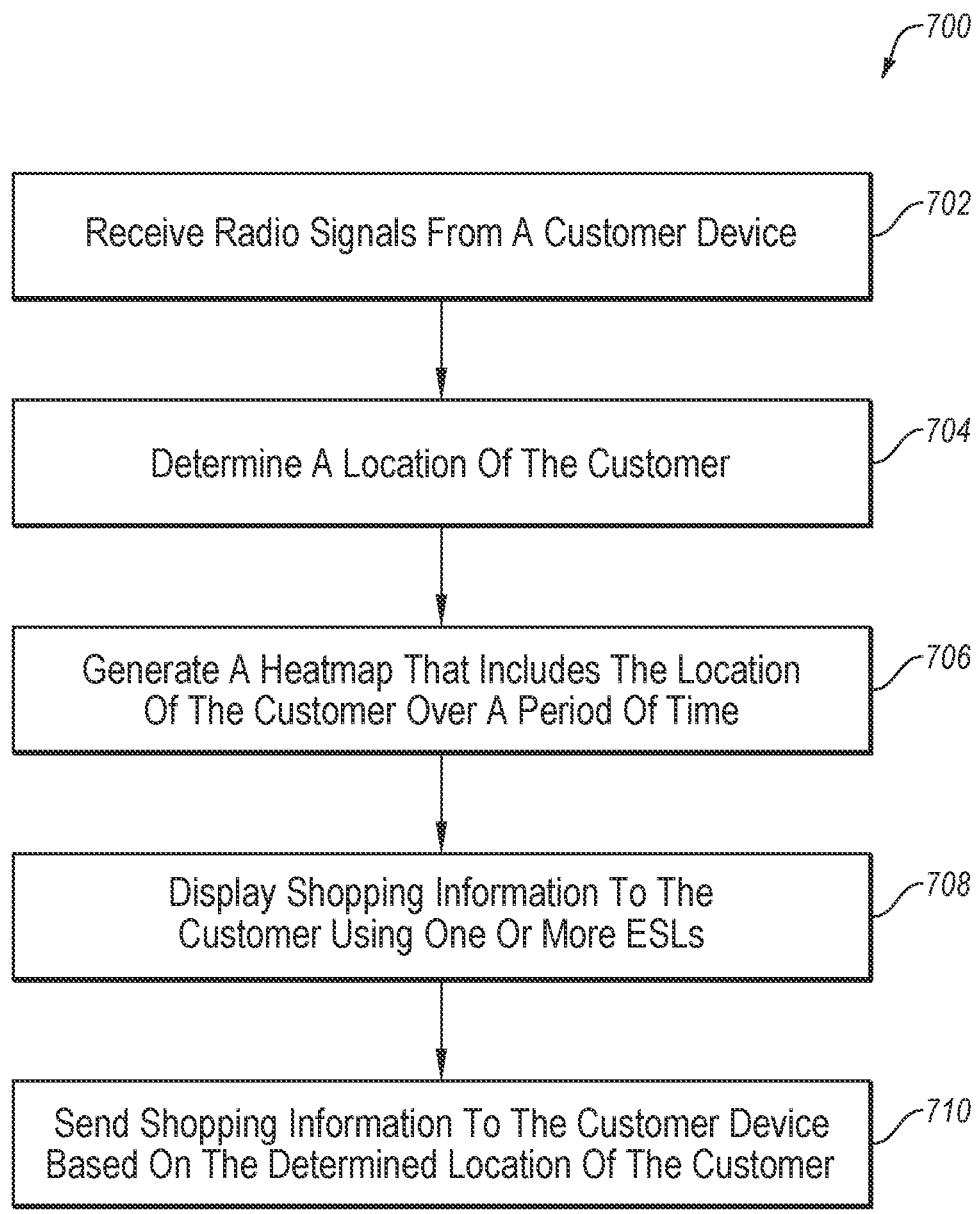
FIG. 7 is a flowchart of an example method of generating a shopper heatmap according to at least one embodiment of the present disclosure.

FIG. 7 is a flowchart of an example method 700 of generating a shopper heatmap according to at least one embodiment of the present disclosure. The method 700 may be performed by any suitable system, apparatus, or device. For example, the shopping store system 500 as described in relation to FIG. 5 or the computer system 800 as described in relation to FIG. 8 may perform one or more operations associated with the method 700. Although illustrated with discrete blocks, the steps and operations associated with one or more of the blocks of the method 700 may be divided into additional blocks, combined into fewer blocks, or eliminated, depending on the particular implementation.

The method 700 may begin at block 702, where radio signals may be received from a device associated with a customer of a shopping store. In some embodiments, the shopping store may include ESLs positioned at various locations, for example, along shelves or the walls of the shopping store. The ESLs may be configured to operate in a reception modality so that the ESLs may receive radio signals transmitted by devices that include short-range radio capabilities within the shopping store, such as a mobile device (e.g., a smartphone) associated with a given customer.

At block 704, a location of the customer may be determined. In some embodiments, the ESLs that received the radio signals transmitted by the device associated with the customer of the shopping store may be communicatively coupled to a computer system that may analyze the received radio signals and determine the location of the customer. For example, the computer system may triangulate the customer's location based on the direction from which two or more of the radio signals are received. As another example, the computer system may estimate the customer's location based on an intensity and the direction of the radio signal received by one or more of the ESLs.

At block 706, a heatmap of the location of the customer over a period of time may be generated. In some embodiments, the computer system may generate a heatmap that is the same as or similar to the heatmap 200 as described in relation to FIG. 2. The heatmap may provide a visualization of a given customer's movement through the shopping store for a single trip to the shopping store or over multiple trips to the shopping store (i.e., within a given window of time). Additionally or alternatively, the heatmap may provide a visualization of several customers' movements through the shopping store within a given window of time.

At block 708, shopping information may be displayed to the customer using one or more of the ESLs. In some embodiments, the shopping information may include product-purchase suggestions based on inferences made from the customer's movement within the shopping store. For example, promotional sales information or coupons for milk may be displayed via the ESLs to a given customer who has spent some amount of time in a cereal section of the shopping store. As another example, information relating to where nails are located within the shopping store or path guidance towards the nails section of the shopping store may be displayed to a given customer who has spent some amount of time in a hammer section of the shopping store.

In these and other embodiments, the shopping information to be displayed to the customer may be determined by a computer system communicatively coupled to the ESLs, such as the computer system that generated the heatmap. The shopping information may be expressly provided by the customer, such as in the form of a grocery list created in a software application that is also communicatively coupled to the computer system. Additionally or alternatively, the shopping information may be generated by the computer system by a machine-learning or an artificial intelligence process. For example, the computer system may generate product-purchase suggestions based on shopping data collected from other customers of the shopping store or similar shopping stores (e.g., customers frequently purchasing eggs with milk or peanut butter with bread).

At block 710, shopping information may be sent to the device associated with the customer based on the determined location of the customer. The shopping information sent to the device associated with the customer may be the same as or similar to the shopping information displayed via the ESLs described in relation to block 708. In some embodiments, the customer's device may include a software application that facilitates communication between the customer's device and a computer system associated with the shopping store. The computer system may be configured to send shopping information intended for a given customer to the given' customer's device through the software application.

Modifications, additions, or omissions may be made to the method 700 without departing from the scope of the disclosure. For example, the designations of different elements in the manner described is meant to help explain concepts described herein and is not limiting. Further, the method 700 may include any number of other elements or may be implemented within other systems or contexts than those described.

Figure 8:
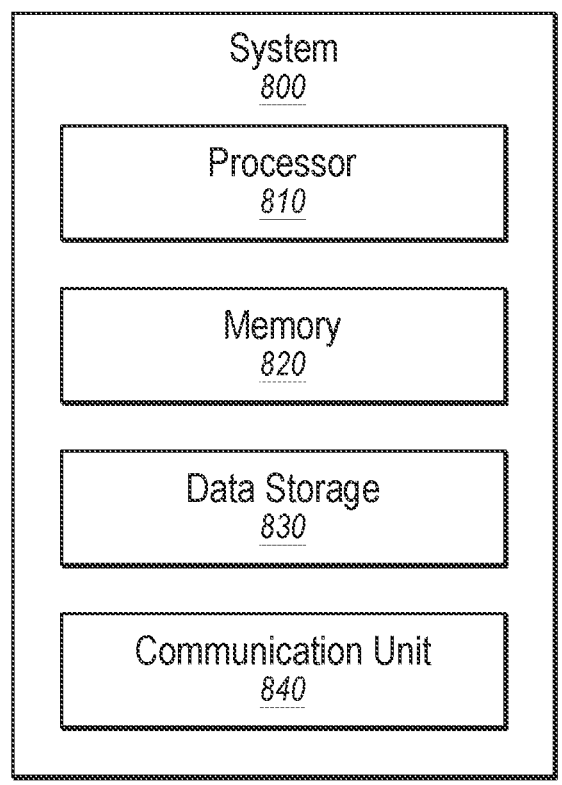
FIG. 8 is an example computer system.

FIG. 8 is an example computer system 800, according to at least one embodiment described in the present disclosure.

The computing system 800 may include a processor 810, a memory 820, a data storage 830, and/or a communication unit 840, which all may be communicatively coupled. Any or all of the computer system of the shopping store in communication with the ESL 100 of FIG. 1 may be implemented as a computing system consistent with the computing system 800.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to cause the computing system 800 to perform one or more operations relating to generation of the heatmap 200 in FIG. 2 and/or the planogram 300 in FIG. 3.

The memory 820 and the data storage 830 may include computer-readable storage media or one or more computer-readable storage mediums for having computer-executable instructions or data structures stored thereon. Such computer-readable storage media may be any available media that may be accessed by a general-purpose or special-purpose computer, such as the processor 810. For example, the memory 820 and/or the data storage 830 may include any of the information displayed by the display 110 of the ESL 100 in FIG. 1, such as product identities, quantities of products in stock, quantities of products sold, etc. In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a particular operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

One skilled in the art, after reviewing this disclosure, may recognize that modifications, additions, or omissions may be made to the system 800 without departing from the scope of the present disclosure. For example, the system 800 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A shopping store system, comprising:
   one or more shelves, wherein each shelf includes one or more levels;
   one or more products placed on the shelves;
   a shopping cart that includes an array of radio receivers that includes a plurality of radio receivers positioned at different heights relative to other radio receivers included in the array;
   a plurality of electronic sign labels (ESLs), wherein each ESL of the plurality of ESLs:
      is located in a particular position corresponding to a respective product placed on the shelves;
      includes a multi-protocol radio that is configured to operate in a reception modality and a transmission modality; and
      includes a display; and
   a computer system configured to:
      receive information transmitted by the each ESL in the transmission modality;
      process information received by the each ESL in the reception modality; and
      generate a planogram of a shopping store that implements the shopping store system by:
         sending an instruction to one or more ESLs of the plurality to operate in the transmission modality to transmit information relating to the products to which each of the ESLs correspond;
         receiving, from the array of radio receivers included with the shopping cart, height information corresponding to locations of the one or more ESLs based on the transmitted information from the one or more ESLs;
         receiving, by the computer system, the information transmitted by the one or more ESLs; and
         generating the planogram detailing the information relating to the products to which the one or more ESLs correspond and a three-dimensional location of the one or more ESLs operating in the transmission modality.

2. The shopping store system of claim 1, wherein one or more ESLs of the plurality of ESLs are configured to operate as radio signal beacons responsive to the multi-protocol radio associated with the one or more ESLs operating in the transmission modality.

3. The shopping store system of claim 2, wherein the radio signal beacons are configured to communicate information relating to the corresponding products with each of the ESLs of the plurality of ESLs to a user device associated with a shopper in a shopping store.

4. The shopping store system of claim 1, further comprising one or more cameras positioned on the shopping cart in which the one or more cameras are configured to capture images of the products placed on the shelves, wherein the images of the products identify stocking levels of the products placed on the shelves.

5. The shopping store system of claim 4, wherein the computer system determines correct stocking locations of the products placed on the shelves based on the images captured by the cameras and the information transmitted by the each ESL in the transmission modality.

6. The shopping store system of claim 1, further comprising a shopping cart that includes an array of radio transmitters, the computer system being configured to generate a planogram of a shopping store that implements the shopping store system using the shopping cart and the plurality of ESLs, wherein generating the planogram comprises:
   receiving, by each ESL of the plurality of ESLs, location information associated with the shopping cart from the array of radio transmitters; and
   compiling, by the computer system, the location information to generate the planogram.

7. The shopping store system of claim 6, wherein one or more ESLs of the plurality of ESLs are configured to determine a location of a shopper in a shopping store that implements the shopping store system responsive to the multi-protocol radio associated with the one or more ESLs operating in the reception modality.

8. The shopping store system of claim 7, wherein the computer system is configured to send instructions, to the display associated with each ESL of the plurality of ESLs, providing shopping guidance to the shopper in the shopping store based on the planogram of the shopping store and the location of the shopper in the shopping store.

9. The shopping store system of claim 8, wherein the display of each ESL is an LED configured to display information based on the location of the shopper relative to the ESL to which the display corresponds.

10. The shopping store system of claim 7, wherein the computer system is configured to send instructions, to a mobile device, providing shopping guidance to the shopper in the shopping store based on the planogram of the shopping store and the location of the shopper in the shopping store.

11. The shopping store system of claim 1, wherein the multi-protocol radio is configured to simultaneously operate in the reception modality and the transmission modality.

12. The shopping store system of claim 1, wherein the computer system is configured to:

receive, from one or more of the ESLs, radio signals transmitted from a device associated with a customer in the shopping store over a period of time;

determine a location of the customer based on the locations of the one or more ESLs in the shopping store that received the radio signal from the device; and generating a heatmap that includes the location of the customer over the period of time.

13. The shopping store system of claim 12, wherein the computer system is further configured to display, by the one or more ESLs in the shopping store, shopping information to the customer based on the determined location of the customer.

14. The shopping store system of claim 12, wherein the computer system is further configured to send shopping information to the device associated with the customer based on the determined location of the customer.

* * * * *